(12) United States Patent
Ha et al.

(10) Patent No.: US 9,047,676 B2
(45) Date of Patent: Jun. 2, 2015

(54) DATA PROCESSING APPARATUS GENERATING MOTION OF 3D MODEL AND METHOD

(75) Inventors: In Woo Ha, Seongnam-si (KR); Jehee Lee, Seoul (KR); Jeong Hwan Ahn, Suwon-si (KR); Jongmin Kim, Seoul (KR)

(73) Assignees: Samsung Electronis Co., Ltd., Suwon-si (KR); SNU R&DB Foundation, Seoul (KR)

( * ) Notice: Subject to any disclaimer, the term of this patent is extended or adjusted under 35 U.S.C. 154(b) by 710 days.

(21) Appl. No.: 12/662,777

(22) Filed: May 3, 2010

(65) Prior Publication Data

US 2010/0332427 A1 Dec. 30, 2010

(30) Foreign Application Priority Data

Jun. 25, 2009 (KR) .................. 10-2009-0057289

(51) Int. Cl.
*G06F 15/18* (2006.01)
*G06T 7/20* (2006.01)
(52) U.S. Cl.
CPC ..... *G06T 7/2033* (2013.01); *G06T 2207/10028* (2013.01); *G06T 2207/20081* (2013.01); *G06T 2207/30196* (2013.01)
(58) Field of Classification Search
USPC .............. 706/12; 345/419, 474; 382/155, 159
See application file for complete search history.

(56) References Cited

U.S. PATENT DOCUMENTS

| 6,157,667 | A  | * | 12/2000 | Johansen et al. | ............... 373/115 |
| 7,961,952 | B2 | * | 6/2011 | Porikli et al. | ................. 382/209 |
| 2010/0277483 | A1 | * | 11/2010 | Lee et al. | ...................... 345/474 |

FOREIGN PATENT DOCUMENTS

| KR | 2002-0037660 | 5/2002 |
| KR | 2005-0058877 | 6/2005 |
| KR | 2007-0120443 | 12/2007 |

OTHER PUBLICATIONS

Sok, K. W., Kim, M., and Lee, J. 2007. Simulating biped behaviors from human motion data. ACM Transactions on Graphics 26, 3.*
Feng, W.-W., Kim, B.-U., and Yu, Y. 2008. Real-Time data driven deformation using kernel canonical correlation analysis. ACM Trans. Graph. 27, 3, Article No. 91.*
T. Melzer, M. Reiter, and H. Bischof, "Appearance Models Based on Kernel Canonical Correlation Analysis," Pattern Recognition, vol. 39, No. 9, pp. 1961-1973, 2003.*
Jang W.-S., Lee W.-K., Lee I.-K., Lee J.: Enriching a motion database by analogous combination of partial human motions. Visual Computer 24, 4 (2008), 271-280.*
Anguelov, D., Srinivasan, P., Koller, D., Thrun, S., Rodgers, J., and Davis, J. 2005. Scape: Shape Completion and Animation of People. ACM Transactions on Graphics 24, 3 (Aug.), 408-416.*

(Continued)

*Primary Examiner* — Kakali Chaki
*Assistant Examiner* — Daniel Pellett
(74) *Attorney, Agent, or Firm* — NSIP Law

(57) ABSTRACT

Provided is a data processing apparatus that may include a storage unit, a first calculator, and a second calculator. The storage unit may store a plurality of training data obtained by motion sensing. The first calculator may calculate a first transformation matrix by performing a regression analysis for the plurality of training data. The second calculator may calculate first output data by applying the first transformation matrix to first input data.

14 Claims, 9 Drawing Sheets

(56) References Cited

OTHER PUBLICATIONS

J. Gall, B. Rosenhahn, T. Brox, and H.-P. Seidel. Optimization and filtering for human motion capture—a multi-layer framework. Int. J. of Computer Vision, 2008.*

Sminchisescu, Cristian, and Bill Triggs. "Estimating articulated human motion with covariance scaled sampling." The International Journal of Robotics Research 22.6 (2003): 371-391.*

Bray, Matthieu, Esther Koller-Meier, and Luc Van Gool. "Smart particle filtering for 3D hand tracking." Automatic Face and Gesture Recognition, 2004. Proceedings. Sixth IEEE International Conference on. IEEE, 2004.*

Glardon, Pascal, Ronan Boulic, and Daniel Thalmann. "PCA-based walking engine using motion capture data." Computer Graphics International, 2004. Proceedings. IEEE, 2004.*

Alexa, Marc. "Linear combination of transformations." ACM Transactions on Graphics (TOG). vol. 21. No. 3. ACM, 2002.*

Deutscher, Jonathan, Andrew Blake, and Ian Reid. "Articulated body motion capture by annealed particle filtering." Computer Vision and Pattern Recognition, 2000. Proceedings. IEEE Conference on. vol. 2. IEEE, 2000.*

Ullman, Shimon, and Ronen Basri. "Recognition by linear combinations of models." IEEE transactions on pattern analysis and machine intelligence 13.10 (1991): 992-1006.*

Zhou, Feng, F. Torre, and Jessica K. Hodgins. "Aligned cluster analysis for temporal segmentation of human motion." Automatic Face & Gesture Recognition, 2008. FG'08. 8th IEEE International Conference on. IEEE, 2008.*

* cited by examiner

DATA PROCESSING APPARATUS GENERATING MOTION OF 3D MODEL AND METHOD

CROSS-REFERENCE TO RELATED APPLICATION

This application claims the benefit of Korean Patent Application No. 10-2009-0057289, filed on Jun. 25, 2009, in the Korean Intellectual Property Office, the disclosure of which is incorporated herein by reference.

BACKGROUND

1. Field

One or more embodiments relate to a data processing apparatus and method that may analyze training data obtained by a motion sensing, and more particularly, to a data processing apparatus and method that may estimate and generate a motion of a three-dimensional (3D) model, for example, an avatar and the like, by analyzing training data when motion sensing occurs.

2. Description of the Related Art

Currently, many people have more interest in a technology that may sense a motion of a target object, for example, a human being in an actual space, and may realize the sensed motion in a three-dimensional (3D) space such as a video game, a virtual world, a computer graphic (CG), and the like.

In the technology referred to with various names, for example, motion estimation, motion capture, etc., it may generally take significant time from a motion sensing operation to a motion capturing operation.

When sensing and capturing a motion of an object, for example, a human being, a more accurate result value may be obtained in proportion to a number of sensors attached to a body of the human being. However, it may also indicate that there exist some constraints on sensing the motion. Specifically, due to the necessity of attaching sensors to the body of the human being, the motion of the human being may be limited. It may be difficult to attach or detach the sensors to or from the body of the human being.

Accordingly, there is a need for a method that may perform motion sensing and motion capturing using a relatively small number of sensors.

SUMMARY

Additional aspects and/or advantages will be set forth in part in the description which follows and, in part, will be apparent from the description, or may be learned by practice of the invention.

According to an aspect of one or more embodiments, there may be provided a data processing apparatus including: a storage unit to store a plurality of training data obtained by motion sensing; a first calculator to calculate a first transformation matrix by performing a regression analysis for the plurality of training data; and a second calculator to calculate first output data by applying the first transformation matrix to first input data.

Each of the training data may include physical information associated with n points sensed in a single frame of the motion sensing, and physical information associated with n1 feature points among the n points. Here, each of n and n1 denotes a natural number.

The first input data may include the physical information associated with the n1 feature points, and the first output data may include the physical information associated with the n points.

The physical information associated with the n1 feature points may include at least one of coordinates, an angle, an angular velocity, and an angular acceleration of each of the n1 feature points. The coordinates of each of the n1 feature points may be obtained using at least one of a motion sensor and a depth camera.

The regression analysis may correspond to a non-linear analysis based on a kernel canonical correlation analysis (KCCA). Also, the regression analysis may correspond to a linear analysis based on a canonical correlation analysis (CCA).

According to another aspect of one or more embodiments, there may be provided a data processing apparatus including: a processor to group, into k groups, a plurality of training data obtained by motion sensing, k denoting a natural number; a storage unit to store k clusters that include the k groups, respectively; a first calculator to calculate k transformation matrices corresponding to the k clusters, respectively, using a regression analysis; and a second calculator to calculate first output data using l transformation matrices selected from the k transformation matrices, when first input data is input, l denoting a natural number less than or equal to k.

The second calculator may calculate the first output data using a linear sum of weighted result values that are obtained by applying a weight to result values obtained by applying the selected l transformation matrices to the first input data. The weight may be in proportion to a correlation between the first input data and each of the l transformation matrices.

Each of the training data may include physical information associated with n points sensed in a single frame of the motion sensing, and physical information associated with n1 feature points among the n points, and each of n and n1 denote a natural number.

The first input data may include the physical information associated with the n1 feature points, and the first output data may include the physical information associated with the n points.

According to still another aspect of one or more embodiments, there may be provided a data processing method including: receiving a plurality of training data obtained by motion sensing at a sensor; calculating a first transformation matrix by performing a regression analysis for the plurality of training data at a processor; and calculating first output data by applying the first transformation matrix to first input data at the first processor, when the first input data is input.

Each of the training data may include physical information associated with n points sensed in a single frame of a motion sensing, and physical information associated with n1 feature points among the n points. Here, each of n and n1 denotes a natural number.

The first input data may include the physical information associated with the n1 feature points, and the first output data may include the physical information associated with the n points.

The regression analysis may correspond to a non-linear analysis based on a KCCA. Also, the regression analysis may correspond to a linear analysis based on a CCA.

According to yet another aspect of one or more embodiments, there may provided a data processing method including: grouping, into k groups, a plurality of training data obtained by motion sensing, k denoting a natural number; storing k clusters that include the k groups, respectively, in a storage unit; calculating k transformation matrices corresponding to the k clusters, respectively, using a regression analysis at a processor; and calculating first output data using l transformation matrices selected from the k transformation matrices at the processor, when first input data is input, l denoting a natural number less than or equal to k.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
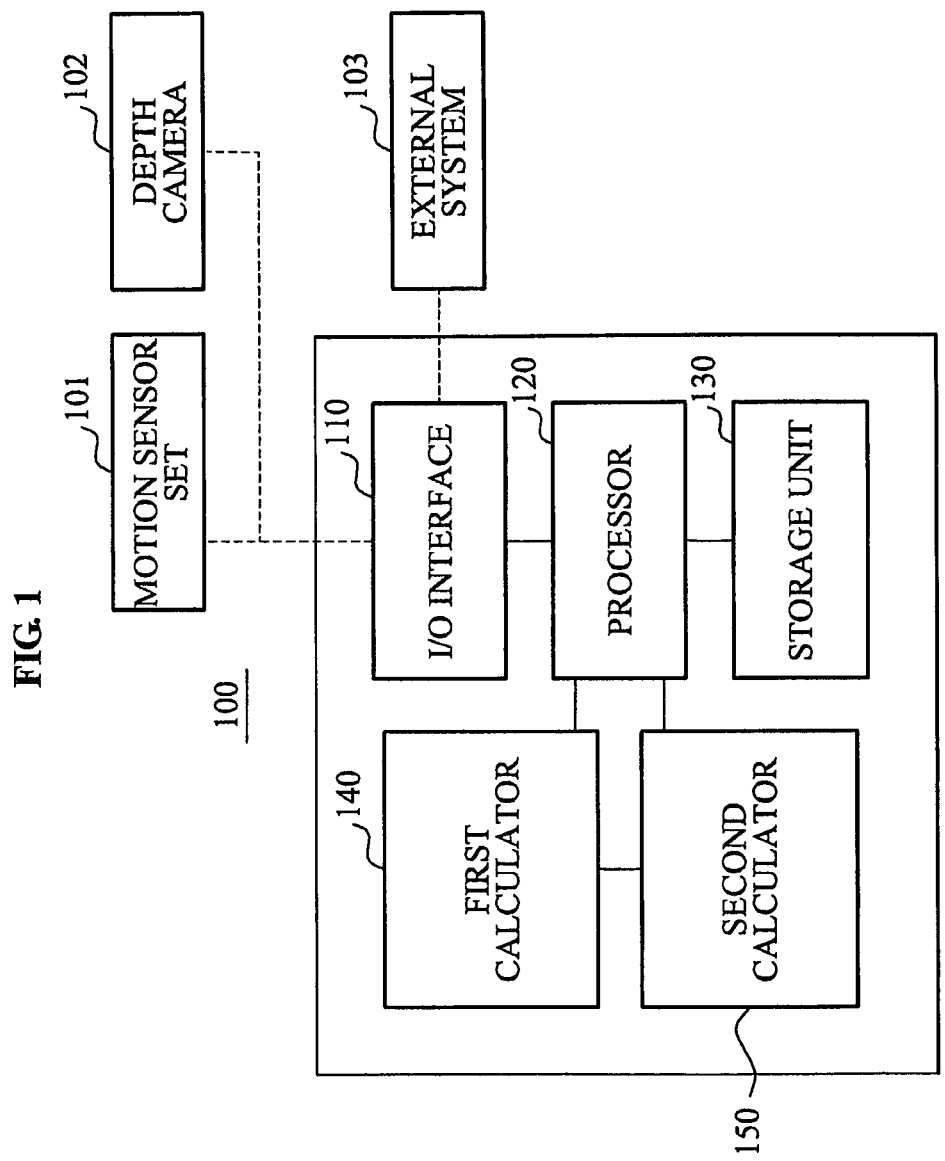
FIG. 1 illustrates a configuration of a data processing apparatus according to an embodiment.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates a configuration of a data processing apparatus 100 according to an embodiment.

Referring to FIG. 1, the data processing apparatus 100 may include an input/output (I/O) interface 110, a processor 120, a storage unit 130, a first calculator 140, and a second calculator 150.

A plurality of training data obtained by motion sensing may be input into the data processing apparatus 100 via the I/O interface 110. The plurality of training data may be stored in the storage unit 130.

The I/O interface 110 enables data to be transmitted to and received from an external device. For example, the I/O interface 110 may be used for a wired type or a serial type of a universal serial bus (USB), a serial-ATA (SATA), a parallel-ATA (PATA), a local area network (LAN), a peripheral component interconnect (PCI) slot, a PCI express slot, an Institute of Electrical and Electronics Engineers (IEEE) 1394, a high definition multimedia interface (HDMI), etc. Also, the I/O interface 110 may be used for a radio type or a non-contact type of a wireless LAN, for example, IEEE 802.11, Bluetooth, a code division multiple access (CDMA), a wideband CDMA (WCDMA), etc.

The above are only examples and thus the I/O interface 110 is not limited thereto. Specifically, the I/O interface 110 may be used for any type of data transmission and reception so that the data processing apparatus 100 may obtain motion sensing information from an external motion sensor set 101 and/or a depth camera 102, and provide processed data to an external system 103.

According to an embodiment, a motion of an object may be estimated by obtaining, from motion sensing, physical information associated with a predetermined number of feature points, for example, coordinates, an angle or an orientation, an angular velocity, an angular acceleration, etc., to calculate physical information associated with the entire points including the predetermined number of feature points.

According to an embodiment, a regression analysis may be used to calculate a transformation function. Depending on embodiments, the transformation function may be a transformation matrix and thus is referred to as the transformation matrix.

The regression analysis will be further described in detail with reference to FIGS. 3 and 4.

The first calculator 140 may calculate a first transformation matrix by performing the regression analysis for the plurality of training data stored in the storage unit 130.

Each of the training data may include physical information associated with n points sensed in a single frame of the motion sensing, and physical information associated with n1 feature points among the n points. Here, each of n and n1 denotes a natural number.

The feature points correspond to a portion of a plurality of points on spatial coordinates, and may be used to estimate a motion of an object, for example, a human being.

The regression analysis corresponds to a non-linear analysis based on a kernel canonical correlation analysis (KCCA). Also, the regression analysis corresponds to a linear analysis based on a CCA.

An operation of the first calculator 140 to calculate the first transformation matrix will be described in detail with reference to FIGS. 3 through 5.

First, input data may be input via the I/O interface 110.

Here, the first input data may include the physical information associated with the n1 feature points that are a portion of the entire n points to be assigned with physical information for a motion estimation, and are measured by at least one of the motion sensor set 101 and the depth camera 102.

When the physical information associated with the n1 feature points is input into the data processing apparatus 100 as the first input data, the second calculator 150 may calculate first output data by applying the first transformation matrix to the first input data.

In this case, the first output data may include the physical information associated with the entire n points used for the motion estimation.

The physical information associated with the n1 feature points may include at least one of coordinates, an angle, an angular velocity, and an angular acceleration of each of the n1 feature points. The coordinates of each of the n1 feature points may be obtained using the motion sensor set 101 and/or the depth camera 102.

Figure 2:
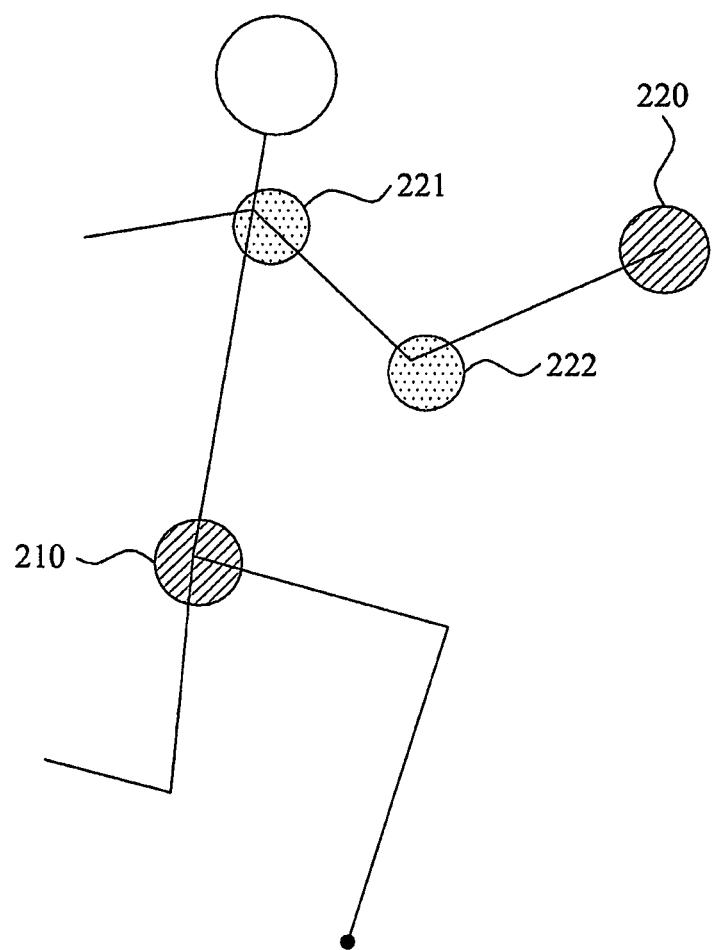
FIG. 2 illustrates a diagram for describing a conventional inverse kinematics scheme.

FIG. 2 illustrates a diagram for describing a conventional inverse kinematics scheme.

In the conventional art, the inverse kinematics scheme is used for a motion estimation. For ease of description, a process of estimating motions of a plurality of points in a two-dimensional (2D) space will be described with reference to FIG. 2.

Among a root point 210, a leaf point 220, and points 221 and 222 between the root point 210 and the leaf point 220, positions of two neighboring points may be associated with each other.

For example, in the case of positions of the root point 210 and the point 221, a mutual distance is constant and only a relative position or angle changes. Also, in the case of positions of the points 221 and 222, or positions of the point 222 and the leaf point 220, the mutual distance is constant and only the relative position or angle change.

When only the 2D space is assumed, the position of the root point 210 and an inter-point distance may be known in advance. In this case, when only three angles are given, it is possible to be aware of positions of the leaf point 220, and the points 221 and 222.

When the position of the leaf point 220 is given, it is possible to calculate the positions of the points 221 and 222. Hereinafter, it will be described in detail with reference to FIG. 3.

Figure 3:
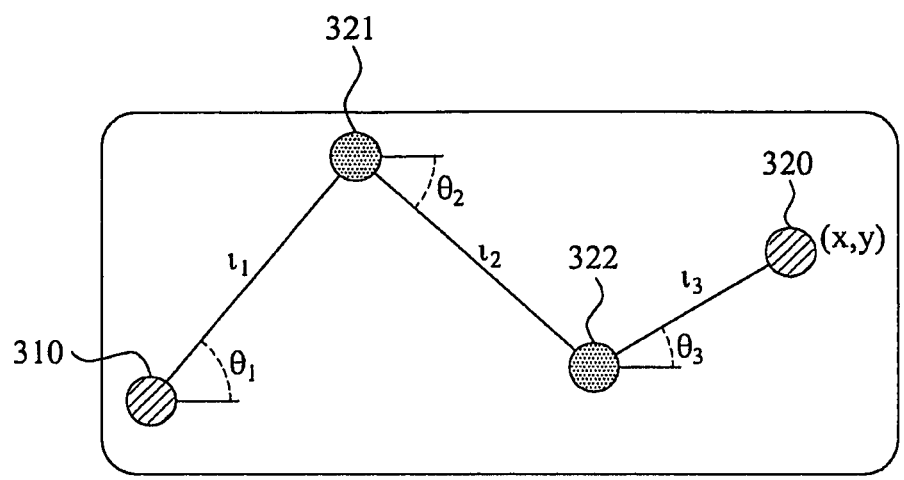
FIG. 3 illustrates an example of motion estimation according to the conventional inverse kinematics scheme of FIG. 2.

FIG. 3 illustrates an example of a motion estimation according to the conventional inverse kinematics scheme of FIG. 2.

Referring to FIG. 3, a distance between a root point 310 and a point 321 is fixed as l1, a distance between the point 321 and a point 322 is fixed as l2, and a point between the point 322 and a point 320 is fixed as l3.

Here, when it is assumed that each of l1, l2, and l3 is a constant, and the root point 310 corresponds to an origin, coordinates (x, y) of the point 320 may be expressed by the following Equation 1:

$$x = l_1 \cos(\theta_1) + l_2 \cos(\theta_2) + l_3 \cos(\theta_3)$$

$$y = l_1 \sin(\theta_1) + l_2 \sin(\theta_2) + l_3 \sin(\theta_3).$$ [Equation 1]

When additional information, for example, x>0, y>0, $\theta_1$>0, $\theta_2$<0, and $\theta_3$>0 exists, and (x, y) are given, it is possible to calculate positions of $\theta_1$, $\theta_2$, and $\theta_3$ using a single solution. Accordingly, it is possible to verify positions of the points 321 and 322.

Specifically, even though only relative coordinates of the point 320 with respect to the root point 310 are known, it is possible to calculate the positions of the remaining points 321 and 322. The aforementioned process is referred to as inverse kinematics. In the above example, the inverse kinematics scheme may calculate physical information, for example, coordinates of the points 321 and 322, using physical information, for example, relative coordinates (x, y) of the single point 320 excluding the root point 310.

The inverse kinematics scheme may be applicable to a simple 2D analysis. However, when a dimension increases and a greater amount of data is input, the inverse kinematics scheme may have some constraints.

According to an embodiment, it is possible to calculate a transformation matrix using a CCA-based regression analysis with respect to linear data, or a KCCA-based regression analysis with respect to non-linear data. The transformation matrix may estimate physical information associated with a large number of points, from physical information associated with a small number of points using training data. The calculation of the transformation matrix will be further described in detail with reference to FIG. 4.

Figure 4:
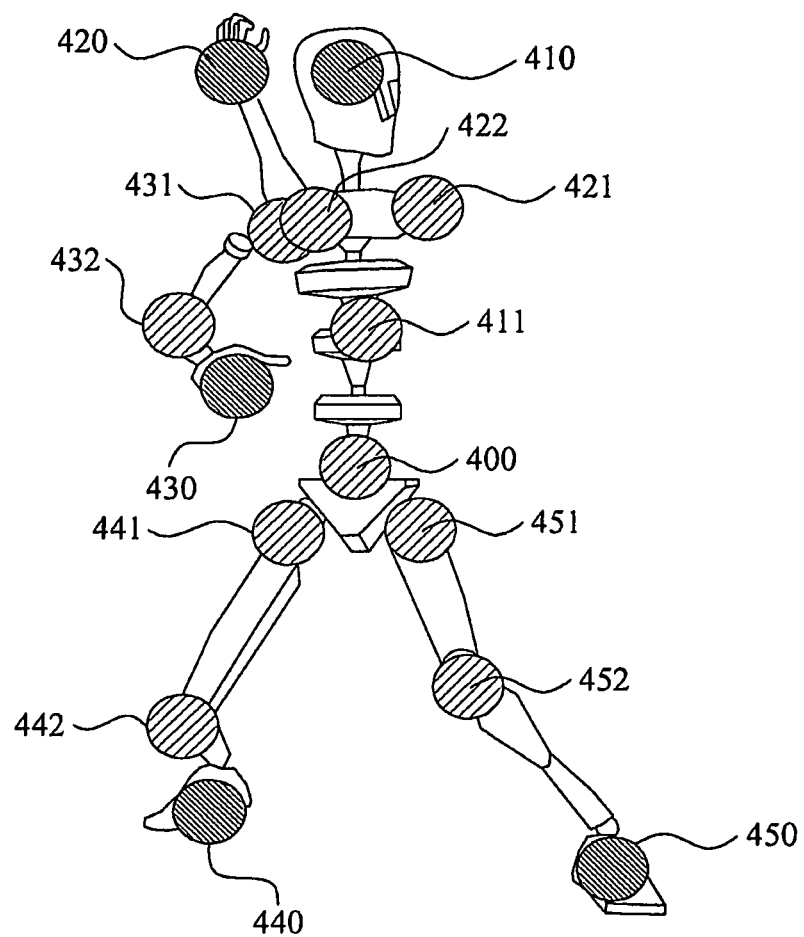
FIG. 4 illustrates physical information associated with a plurality of points included in input data by motion sensing according to an embodiment.

FIG. 4 illustrates physical information associated with a plurality of points included in data of a single frame input by motion sensing according to an embodiment.

For ease of description, physical information associated with 15 points corresponding to major joints of a human being may be sensed in the single frame, and be input. However, it is only an example and thus the number of points per each frame may vary.

Referring to FIG. 4, points 410, 411, 420, 421, 422, 430, 431, 432, 440, 441, 442, 450, 451, and 452 included in the single frame may be associated with a root point 400.

Each of the points 411, 441, and 451 may be associated with the root point 400. Each of the points 410, 421, and 431 may be associated with the point 411. The point 442 may be associated with the point 441. The point 452 may be associated with the point 451.

In addition, the point 420 may be associated with the point 422. The point 430 may be associated with the point 432. The point 440 may be associated with the point 442. The point 450 may be associated with the point 452.

The above associated points may constitute a hierarchical relationship having the root point 400 as a parent node. In this case, among the entire points 410, 411, 420, 421, 422, 430, 431, 432, 440, 441, 442, 450, 451, and 452, the points 410, 420, 430, 440, and 450 may be designated as feature points.

In a case where a correlation between physical information associated with feature points and information associated with the entire points is learned, even though only physical information associated with the feature points is input, it is possible to calculate physical information associated with the entire points.

According to an embodiment, it is possible to generate a transformation matrix between physical information associated with feature points and physical information associated with the entire points, through a correlation training.

Physical information associated with each point may include a position, a velocity, an acceleration, an orientation or an angle, an angular velocity, an angular acceleration, etc.

The physical information associated with each point may include only a portion of the position, the velocity, the acceleration, the orientation or the angle, the angular velocity, the angular acceleration, etc. For example, the physical information may include only the orientation or the angle, the angular velocity, and the angular acceleration with respect to an upper point.

As described above, an inter-point relationship may be learned. When single frame data of FIG. 4 is input into the data processing apparatus 100, the processor 120 may store the single frame data in the storage unit 130.

When a plurality of frame data is input, the processor 120 may store the plurality of frame data in the storage unit 130.

As described above, the transformation matrix corresponds to an operator or a function that enables estimating of the entire points, required for a motion capturing operation of a single frame, using input feature points, when the feature points corresponding to a portion of the entire points are input.

Hereinafter, a process of calculating any one transformation matrix among k transformation matrices corresponding to clusters, respectively, using a regression analysis, for example, a CCA-based regression analysis or a KCCA-based regression analysis will be described.

(1) CCA-Based Regression Analysis:

A CCA denotes one of machine learning algorithms that may maximize a correlation between training data including a pair of an input value and an output value. Specifically, the CCA may decrease a dimension of the input value and the output value, and maximize a correlation between input and output with the decreased dimension.

As described above, the dimension of the input value and the output value may be decreased, and the correlation between the input and the output with the decreased dimension may be maximized using the CCA. Accordingly, in comparison to performing a regression analysis for a relationship between the original input and output, the CCA may avoid overfitting when the regression analysis is performed for a relationship between the input and the output with the decreased dimension.

According to an embodiment, since the input value and the output value of the training data, for example, feature point information and entire point information of the training data, constitute a non-linear relationship, it is possible to reconfigure the non-linear relationship in a non-linear space by applying a kernel trick to the CCA.

(2) Kernel Scheme

In a learning operation of storing a determinant regarding a relationship between input data, for example, feature point information, and motion capture data, for example, entire point information input by a 3D motion sensing, when the input data and the output data constitute a non-linear relationship, there may be some constraints on using a CCA of learning a linear relationship. Accordingly, a KCCA of learning the non-linear relationship may be used.

Mapping of input data x and a feature space having a higher dimension than the input data x may be expressed by the following Equation 2:

$$\phi: x = (x_1, \ldots, x_n) \to \phi(x) = (\phi_1(x), \ldots, \phi_N(x))(N > n) \quad \text{[Equation 2]}$$

A difference between the CCA and the KCCA may lie in that the CCA is based on an original dimension of training data, whereas the KCCA is based on a feature space having a higher dimension.

To avoid converting a dimension of the input data to a higher dimension, a multiplication may be performed for an inner product of two vectors. Here, a kernel function may be used.

The kernel function $k(a,b)$ may be the inner product $\phi(a)^T \phi(b)$ of two vectors existing in the feature space. For example, when input data $a=(a_1, a_2)$ is given, and the given input data is converted to a secondary monomial form, $(a_1^2, a_2^2, a_1 a_2, a_1 a_2)$ may be obtained. The kernel function may be expressed by the following Equation 3:

$$\phi(a)^T \phi(b) = k(a,b) = (a^T b)^2. \quad \text{[Equation 3]}$$

(3) KCCA:

$n_t$ input data pairs may be expressed by $\{x^i, y^i\}_{i=1}^{n_t}$. Here, $x^i \in R^n$, $y^i \in R^m$, $x^i$ denotes an input value of an i-th training interval, and $y^i$ denotes an output value of the i-th training interval. In this case, the input value and the output value of the training interval may be expressed in a form of a matrix as given by the following Equation 4:

$$X = \{x^1, x^2, \ldots, x^{n_t}\}$$

$$Y = \{y^1, y^2, \ldots, y^{n_t}\}. \quad \text{[Equation 4]}$$

In a CCA of learning a linear relationship, an equation to maximize a correlation $\rho$ between two data may be expressed by the following Equation 5:

$$\max_{v_x, v_y} \rho = \max_{v_x, v_y} \frac{v_x^T C_{xy} v_y}{\sqrt{v_x^T C_{xx} v_x v_y^T C_{yy} v_y}}, \quad \text{[Equation 5]}$$

where $$C_{xx} = cov(x, x), \ C_{xy} = cov(x, y),$$

and $$C_{yy} = cov(y, y).$$

In a KCCA having a higher dimension, $C_{xx}$, $C_{yy}$, and $C_{xy}$ indicating a mutual correlation degree may be expressed by the following Equation 6:

$$C_{xx} = \phi(X)\phi(X)^T$$

$$C_{yy} = \phi(Y)\phi(Y)^T$$

$$C_{xy} = \phi(X)\phi(Y)^T. \quad \text{[Equation 6]}$$

Also, since $v_x$ and $v_y$ corresponding to a basis pair in a higher dimension where X and Y are non-linearly converted do not exist in a space constituted by $\phi(X)$ and $\phi(Y)$, $v_x = \phi(X)\omega_x$, $v_y = \phi(Y)\omega_y$.

In this case, an equation to maximize the correlation $\rho$ in the KCCA may be expressed by the following Equation 7:

$$\max_{\omega_x, \omega_y} \rho = \max_{\omega_x, \omega_y} \frac{\omega_x^T K_x K_y \omega_y}{\sqrt{\omega_x^T (K_x)^2 v_x v_y^T (K_y)^2 v_y}}, \quad \text{[Equation 7]}$$

where $$K_x = \phi(X)^T \phi(X),$$

and $$K_y = \phi(Y)^T \phi(Y).$$

In this case, i-th $\{w_x^i, w_y^i\}$ may be calculated using a singular value decomposition (SVD), as given by the following Equation 8, and may be expressed by the following Equation 9:

$$((K_x)^2)^{-\frac{1}{2}} K_x K_y ((K_y)^2)^{-\frac{1}{2}} = UDV^T, \quad \text{[Equation 8]}$$

$$w_x^i = ((K_x)^2)^{-\frac{1}{2}} U^i \quad \text{[Equation 9]}$$

$$w_y^i = ((K_y)^2)^{-\frac{1}{2}} V^i.$$

Here, $U_i$ and $V_i$ denote i-th column vectors of U and V. Using the above scheme, it is possible to obtain a plurality of pairs of $w_x$ and $w_y$, a maximum of $n_t$ pairs.

To decrease a dimension of input data, $n_w$ pairs of $w_x$ and $w_y$ less than the dimension of the input data may be extracted. The extracted $w_x$ and $w_y$ may be expressed in a form of a matrix, as given by the following Equation 10:

$$W_x = (w_x^1, w_x^2, \ldots, w_x^{n_w})$$

$$W_y = (w_y^1, w_y^2, \ldots, w_y^{n_w}). \quad \text{[Equation 10]}$$

Here, a result of projecting an input value x to a basis $u_x^i$ may be expressed by the following Equation 11:

$$\phi(x)^T v_x^i = \sum_{j=1}^{n_t} w_{x,j}^i \phi(x)^T \phi(x^j) \quad \text{[Equation 11]}$$

$$= \sum_{j=1}^{n_t} w_{x,j}^i k_x(x, x^j).$$

Accordingly, input data $x_r \in R^{n_w}$ with the decreased dimension may be calculated as given by the following Equation 12:

$$x_r = W_x^T \eta_x. \quad \text{[Equation 12]}$$

Here, $\eta_x \in R^{n_t}$ denotes a vector including kernel functions. $k_x(x, x^j)$ denotes a j-th element of the vector.

(4) Regression Analysis:

The regression analysis may include three operations.

Initially, when $n_t$ input pairs $\{x^i, y^i\}_{i=1}^{n_t}$ are given, $n_w$ bases may be obtained using a KCCA scheme.

A matrix $F_x$ of mapping $X_r \in R^{n_w \times n_t}$ and $Y_r \in R^{n_w \times n_t}$ to $X_r$ and $Y_r$ may be calculated using a least square scheme, as given by the following Equation 13:

$$\min_{F_x} \sum_{i=1}^{n_t} \|F_x x_r^i - y_r^i\|^2. \qquad \text{[Equation 13]}$$

In the above process, a transformation matrix of the decreased dimension may be obtained. A matrix $P_y$ that is converted from the decreased dimension to the output value may be obtained using a least square scheme, as given by the following Equation 14:

$$\min_{P_y} \sum_{i=1}^{n_t} \|P_y x_r^i - y^i\|^2. \qquad \text{[Equation 14]}$$

Since the obtained $W_x$, $F_x$, and $P_y$ constitute continuous linear mapping, they can be expressed by a single operator $Q_f = P_y F_x W_x$.

Accordingly, when a new input value $\tilde{x}$ exists, an output value $\tilde{y}$ may be calculated according to the following Equation 15:

$$\begin{aligned}\tilde{y} &= Q_f \tilde{x} \\ &= P_y F_x W_x \tilde{x}.\end{aligned} \qquad \text{[Equation 15]}$$

The obtained operator $Q_f$ corresponds to the transformation matrix.

The first calculator 140 may calculate the transformation matrix, using the plurality of training data stored in the storage unit 130, according to the aforementioned scheme.

The plurality of training data may be grouped into a plurality of groups and thereby be managed according to their type.

When the transformation matrix that is a correlation between feature points and the entire points is calculated using the plurality of training data, a calculation result according to the transformation matrix may be more accurate as a correlation between the plurality of training data becomes higher.

For example, when the plurality of training data is obtained by motion sensing with respect to a human being in motion, training data obtained from a first motion may be grouped into a first group. Training data obtained from a second motion may be grouped into a second group.

The first calculator 140 may calculate a first transformation matrix using the training data of the first group, and calculate a second transformation matrix using the training data of the second group. The processor 120 may determine whether the input first data is similar to the first motion or to the second motion, and select a transformation matrix to be applied between the first transformation matrix and the second transformation matrix. The second calculator 150 may calculate the first output data using the selected transformation matrix.

Also, a linear sum of a value calculated using the first transformation matrix and a value calculated using the second transformation matrix by assigning a weight depending on how similar to the first motion and the second motion the first input data is may be output as the first output data.

An embodiment of grouping and managing a plurality of training data into a plurality of groups, for example, clusters, will be described in detail with reference to FIG. 5.

Figure 5:
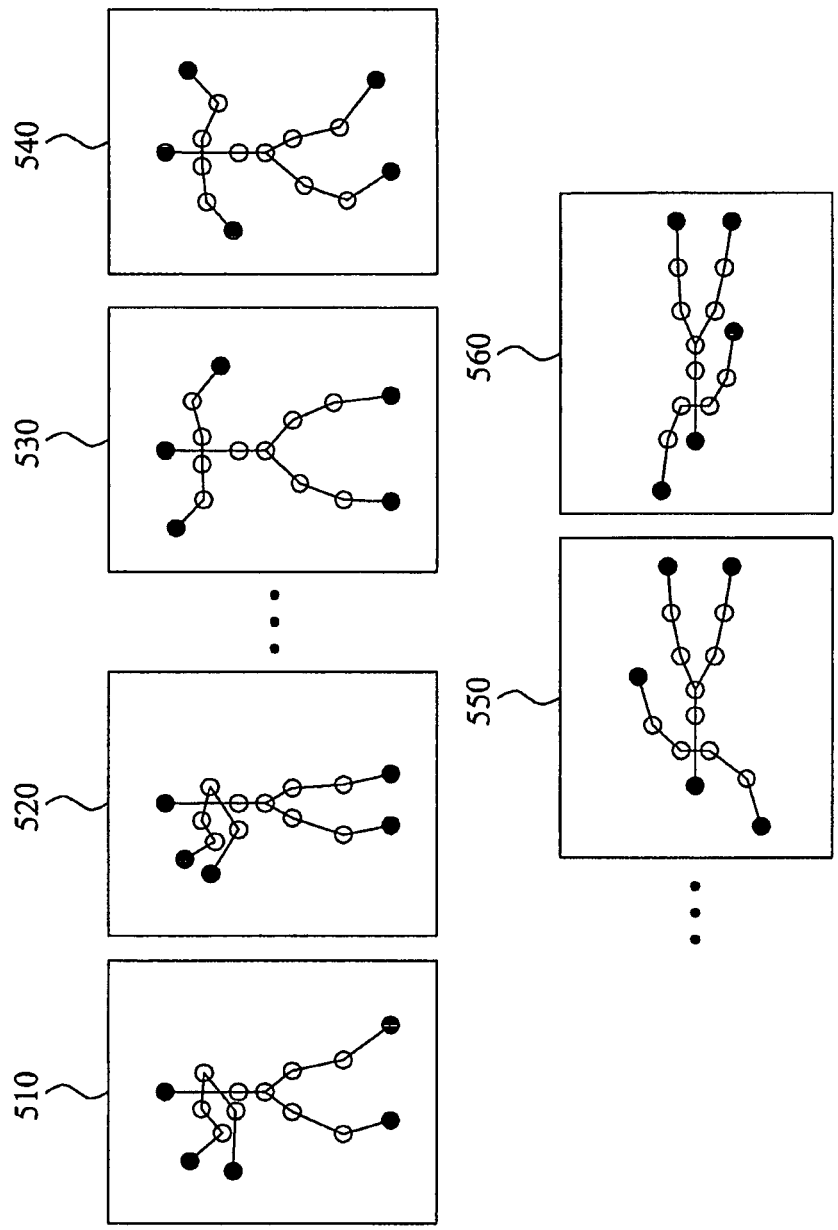
FIG. 5 illustrates diagrams describing input data allocated to a plurality of clusters according to an embodiment.

FIG. 5 illustrates diagrams describing input data allocated to a plurality of clusters according to an embodiment.

Referring to FIG. 5, training data 510, 520, 530, 540, 550, and 560 may be obtained by sensing various types of motions of a human being.

The training data 510 and 520 may be obtained from a first behavior, for example, boxing. The training data 530 and 540 may be obtained from a second behavior, for example, snowboarding. The training data 550 and 560 may be obtained from a third behavior, for example, swimming.

As described above, instead of calculating a single transformation matrix with respect to the training data 510, 520, 530, 540, 550, and 560, the training data 510, 520, 530, 540, 550, and 560 may be grouped into the plurality of clusters. A transformation matrix with respect to each of the clusters may be calculated.

For example, training data estimated as the first behavior, for example, the training data 510 and 520 may be allocated to a first cluster. Training data estimated as the second behavior, for example, the training data 530 and 540 may be allocated to a second cluster. Training data estimated as the third behavior, for example, the training data 550 and 560 may be allocated to a third cluster.

Specifically, clustering may be performed for similar training data by comparing a plurality of input training data. A transformation matrix may be calculated for each cluster.

In FIG. 5, the training data 510 and 520 are allocated to a first cluster, the training data 530 and 540 are allocated to a second cluster, and the training data 550 and 560 are allocated to a k-th cluster.

The first calculator 140 may calculate a transformation matrix with respect to each of the first cluster, the second cluster, and the k-th cluster.

Figure 6:
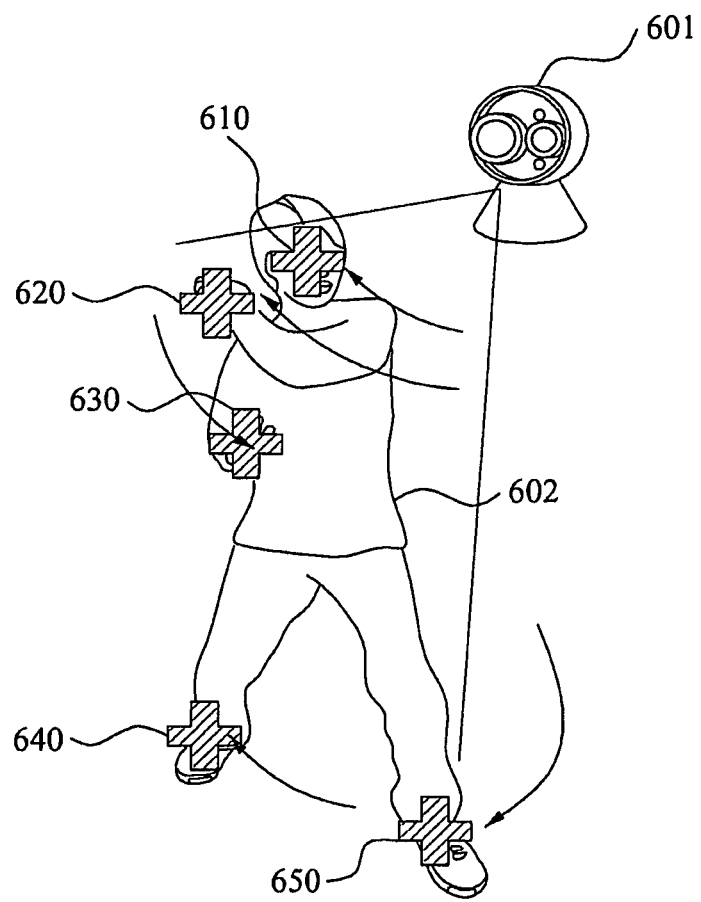
FIG. 6 illustrates a process of obtaining data that includes physical information associated with a plurality of points by motion sensing according to an embodiment.

FIG. 6 illustrates a process of obtaining data that includes physical information associated with a plurality of points by a motion sensing according to an embodiment.

When k clusters and transformation matrices are obtained, it is possible to sense feature points 610, 620, 630, 640, and 650 as shown in FIG. 6.

A sensor 601 may analyze physical information associated with the feature points 610, 620, 630, 640, and 650 of a human being 602. For example, the physical information may include an orientation, an angular velocity, an angular acceleration, etc.

For data including information associated with the feature points 610, 620, 630, 640, and 650, the processor 120 may select, from the k clusters, a transformation matrix of any one cluster having a high similarity. When a plurality of training data is collectively managed and thus only a single transformation matrix is calculated, the above selection operation may not be required.

The second calculator 150 may calculate an estimate of an operation of the entire points, for example, 15 points by applying the selected transformation matrix to the data.

For example, when the data including the feature points 610, 620, 630, 640, and 650 is input, information associated with the entire points of FIG. 4 may be calculated.

Here, a single cluster having a highest similarity may be selected from the k clusters and only a transformation matrix of the selected cluster may be applied.

However, the above is only an example. Specifically, the entire point information may be calculated by selecting two clusters from the k clusters, applying a transformation matrix of each of the selected two clusters to the data, and obtaining a linear sum through a multiplication of a weight according to a similarity.

Figure 7:
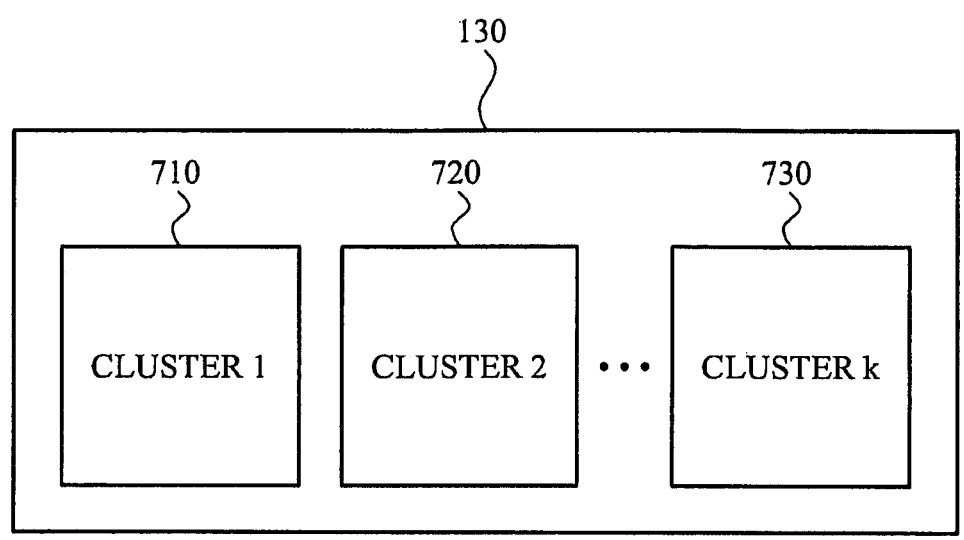
FIG. 7 illustrates a storage unit of FIG. 1.

FIG. 7 illustrates the storage unit 130 of FIG. 1 in a case where training data is grouped into k clusters and thereby is managed, and thus the first calculator 140 calculates k transformation matrices corresponding to the k clusters, respectively.

The storage unit 130 may include physically and/or logically grouped clusters (cluster 1, cluster 2, . . . , cluster k) 710, 720, and 730.

Each of the clusters (cluster 1, cluster 2, . . . , cluster k) 710, 720, and 730 may store a plurality of training data.

Figure 8:
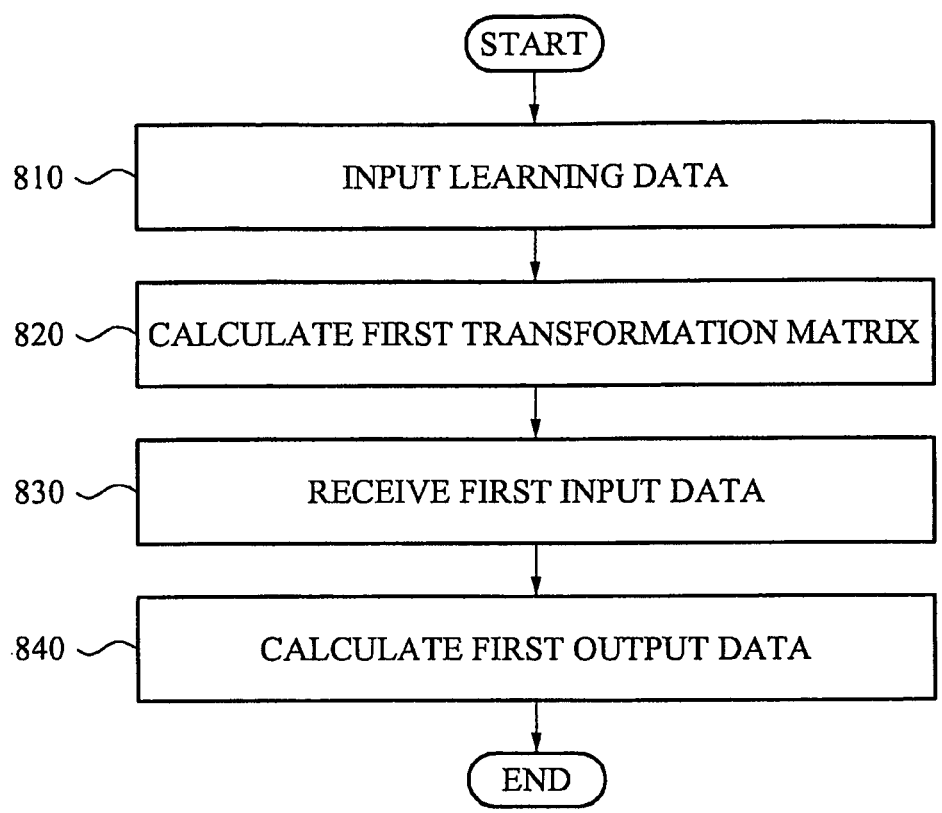
FIG. 8 illustrates a flowchart of a data processing method according to an embodiment.

FIG. 8 illustrates a flowchart of a data processing method according to an embodiment. The data processing method may be performed by constituent elements of the data processing apparatus 100.

In operation 810, a plurality of training data may be input.

A type of physical information including the plurality of training data is described above with reference to FIG. 1 and thus further detailed description related thereto will be omitted here.

In operation 820, the first calculator 140 may calculate a first transformation matrix using a regression analysis, for example, a KCCA-based regression analysis, etc.

The calculation process is described above with reference to FIGS. 3 through 5.

Here, a single transformation matrix may be calculated with respect to the entire training data without grouping the training data.

However, it is only an example. Specifically, it is also possible to group the training data into clusters and to calculate a transformation matrix with respect to each of the clusters using the regression analysis, for example, the KCCA-based regression analysis.

In operation 830, first input data including physical information associated with feature points may be received. The first input data may be obtained by the motion sensor set 101 and/or the depth camera 102, for example.

In operation 840, the second calculator 150 may calculate first output data based on physical information associated with the entire points including the feature points, by applying the calculated first transformation matrix to the first input data, and may use the first output data for motion estimation.

When the training data is grouped into the plurality of clusters, at least one transformation matrix may be selected from a plurality of transformation matrices corresponding to the plurality of clusters, respectively. The selected at least one transformation matrix may be used by the second calculator 150.

When at least two transformation matrices are selected, a linear sum that is obtained by multiplying a weight according to a similarity between the first input data and training data of each cluster may be provided as first result data.

Figure 9:
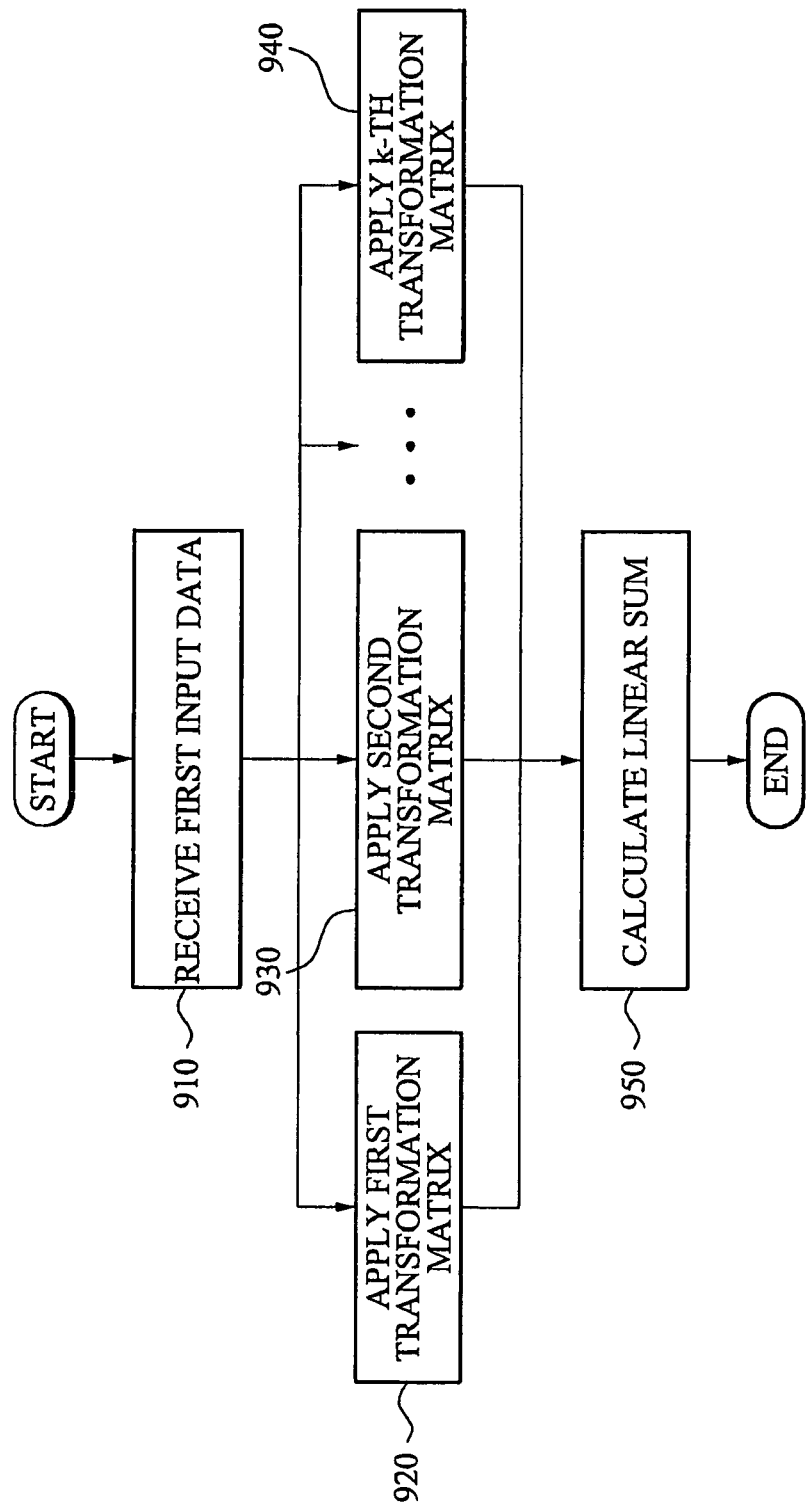
FIG. 9 illustrates a flowchart of a data processing method according to another embodiment.

FIG. 9 illustrates a flowchart of a data processing method according to another embodiment. Specifically, FIG. 9 illustrates a process of calculating, by the second calculator 150, first result data in a case where training data is grouped into a plurality of clusters and thereby is managed.

In operation 910, first input data may be received.

Here, the second calculator 150 may apply, in series or in parallel, a plurality of transformation matrices to the first input data.

For example, when the processor 120 selects k transformation matrices, the second calculator 150 may apply a first transformation matrix to the first input data in operation 920. Through this, the second calculator 150 may calculate a first intermediate value.

In operation 930, the second calculator 150 may apply a second transformation matrix to the first input data, and calculate a second intermediate value. In operation 940, the second calculator 150 may apply a k-th transformation matrix to the first input data, and calculate a k-th intermediate value.

A linear or non-linear weight may be assigned to the calculated k intermediate values according to a similarity between training data of each cluster and the first input data. A sum of the assigned weights may be "1".

In operation 950, a sum of the weighted k intermediate values may be calculated, and be provided as first result data.

The first result data may include physical information associated with the entire points including the feature points, and be used for a motion estimation.

The data processing method according to the above-described embodiments may be recorded in computer-readable media including program instructions to implement various operations executable by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions to be performed by the hardware devices include both machine code, such as produced by a compiler, and files containing higher level code that may be executed by the computer using an interpreter. The described hardware devices may be configured to implement one or more software modules in order to perform the operations of the above-described embodiments, or vice versa.

Although a few embodiments have been shown and described, it would be appreciated by those skilled in the art that changes may be made in these embodiments without departing from the principles and spirit of the disclosure, the scope of which is defined by the claims and their equivalents.

What is claimed is:

1. An apparatus to process data, comprising:
   a storage unit to store a plurality of training data obtained by motion sensing;
   a first calculator to calculate a first transformation matrix by performing a regression analysis using the training data; and
   a second calculator to calculate output data by applying the first transformation matrix to input data,
   wherein the input data corresponds to n1 feature points among n points associated with an object, where n1 is less than n and each of n and n1 denote a natural number,
   wherein the output data includes physical information for the n points of the object for a single frame, the physical information being obtained by the applying of the first transformation matrix to the input data,
   wherein the first transformation matrix is related to a correlation between physical information associated with n1 feature points and physical information associated with n points, and
   wherein the regression analysis corresponds to a non-linear analysis based on a kernel canonical correlation analysis (KCCA).

2. The apparatus of claim 1, wherein each of the training data includes physical information associated with n points sensed in a single frame of the motion sensing, and physical information associated with n1 feature points among the n points, and the input data includes physical information associated with the n1 feature points.

3. The apparatus of claim 2, wherein the physical information associated with the n1 feature points includes at least one of coordinates, an angle, an angular velocity, and an angular acceleration of each of the n1 feature points.

4. The apparatus of claim 3, wherein the coordinates of each of the n1 feature points are obtained using at least one of a motion sensor and a depth camera.

5. An apparatus to process data, comprising:
a processor to group, into a plurality of k groups, a plurality of training data obtained by motion sensing, k denoting a natural number;
a storage unit to store a plurality of k clusters that include the plurality of k groups, respectively;
a first calculator to calculate a plurality of k transformation matrices corresponding to the plurality of k clusters, respectively, using a regression analysis; and
a second calculator to calculate output data using a plurality of l transformation matrices selected from the plurality of k transformation matrices, when input data is input, l denoting a natural number less than or equal to k,
wherein the regression analysis corresponds to a non-linear analysis based on a kernel canonical correlation analysis (KCCA),
wherein the second calculator calculates the output data using a linear sum of weighted result values that are obtained by applying respective weights to result values obtained by applying the selected l transformation matrices to the input data, the respective weights having values which are in proportion to a correlation between the input data and respective training data of the cluster corresponding to the l transformation matrices,
wherein l transformation matrices are selected from k transformation matrices based on a similarity of k clusters.

6. The apparatus of claim 5, wherein each of the training data includes physical information associated with n points sensed in a single frame of the motion sensing, and physical information associated with n1 feature points among the n points, each of n and n1 denoting a natural number, the input data including the physical information associated with the n1 feature points, and the output data including the physical information associated with the n points.

7. A method of processing data, comprising:
receiving a plurality of training data obtained by motion sensing at a sensor;
calculating a first transformation matrix by performing a regression analysis for the plurality of training data at a processor; and
calculating first output data by applying the first transformation matrix to input data at the processor, when the input data is input,
wherein the input data corresponds to n1 feature points among n points associated with an object, where n1 is less than n and each of n and n1 denote a natural number,
wherein the output data includes physical information for the n points of the object for a single frame, the physical information being obtained by the applying of the first transformation matrix to the input data,
wherein the first transformation matrix is related to a correlation between physical information associated with n1 feature points and physical information associated with n points, and
wherein the regression analysis corresponds to a non-linear analysis based on a kernel canonical correlation analysis (KCCA).

8. The method of claim 7, wherein each of the training data includes physical information associated with n points sensed in a single frame of a motion sensing, and physical information associated with n1 feature points among the n points, and the input data includes physical information associated with the n1 feature points.

9. The method of claim 8, wherein the physical information associated with the n1 feature points includes at least one of coordinates, an angle, an angular velocity, and an angular acceleration of each of the n1 feature points.

10. The method of claim 9, wherein the coordinates of each of the n1 feature points are obtained using a motion sensor.

11. The method of claim 9, wherein the coordinates of each of the n1 feature points are obtained using a depth camera.

12. A method of processing data, comprising:
grouping a plurality of training data obtained by motion sensing into a plurality of k groups, k denoting a natural number;
storing a plurality of k clusters that include the k groups, respectively, in a storage unit;
calculating a plurality of k transformation matrices corresponding to the plurality of k clusters, respectively, using a regression analysis at a processor; and
calculating first output data using a plurality of l transformation matrices selected from the plurality of k transformation matrices, when input data is input, at the processor, l denoting a natural number less than or equal to k,
wherein the regression analysis corresponds to a non-linear analysis based on a kernel canonical correlation analysis (KCCA),
wherein the calculating first output data uses a linear sum of weighted result values that are obtained by applying respective weights to result values obtained by applying the selected l transformation matrices to the input data, the respective weights having values which are in proportion to a correlation between the input data and respective training data of the cluster corresponding to the l transformation matrices,
wherein l transformation matrices are selected from k transformation matrices based on a similarity of k clusters.

13. A non-transitory computer-readable recording medium storing having stored thereon instructions to cause a computer to implement a data processing method, the method comprising:
receiving a plurality of training data obtained by motion sensing at a sensor;
calculating a first transformation matrix by performing a regression analysis for the plurality of training data at a processor; and
calculating first output data by applying the first transformation matrix to input data at the processor, when the input data is input,
wherein the regression analysis corresponds to a non-linear analysis based on a kernel canonical correlation analysis (KCCA),
wherein the input data corresponds to n1 feature points among n points associated with an object, where n1 is less than n and each of n and n1 denote a natural number,
wherein the output data includes physical information for the n points of the object for a single frame, the physical information being obtained by the applying of the first transformation matrix to the input data, and
wherein the first transformation matrix is related to a correlation between physical information associated with n1 feature points and physical information associated with n points.

14. The apparatus of claim 5, wherein each of the k clusters correspond to a behavior of a subject and include a plurality of training data, and are grouped by comparing the plurality of input training data.

* * * * *